May 5, 1931. B. BEANE 1,804,304
COMBINED BUMPER AND MUD GUARD
Original Filed Aug. 17, 1928
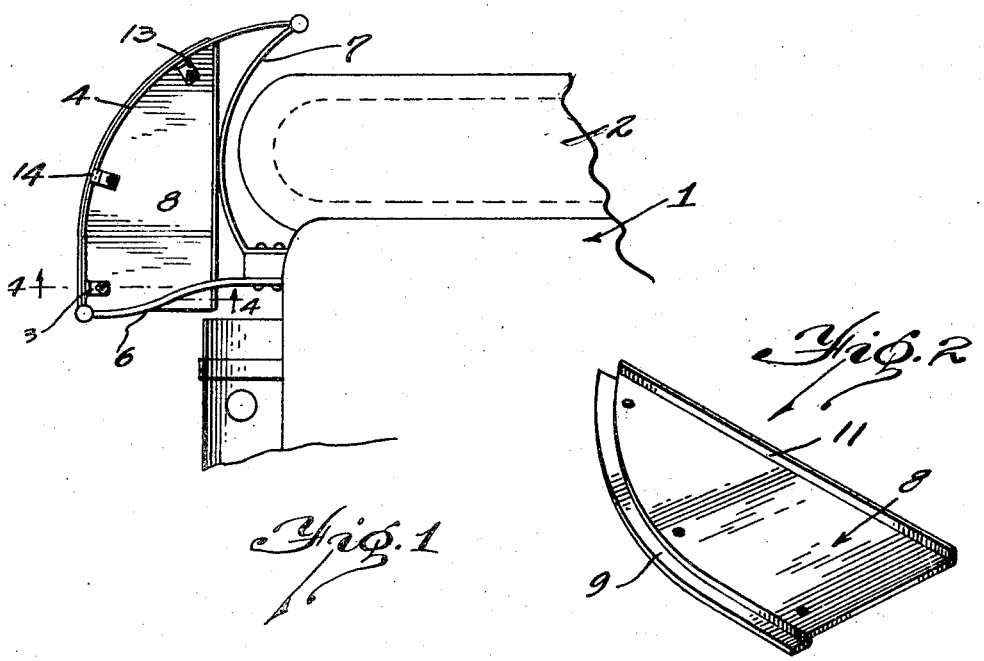
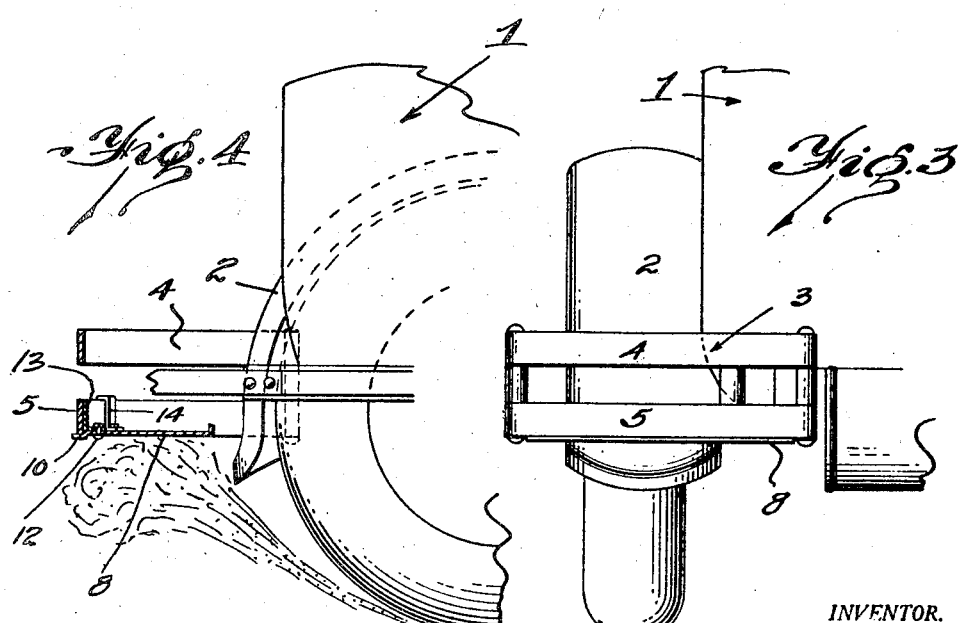
INVENTOR.
Bella Beane.
BY
ATTORNEY.

Patented May 5, 1931

1,804,304

UNITED STATES PATENT OFFICE

BELLA BEANE, OF ALPENA, MICHIGAN

COMBINED BUMPER AND MUD GUARD

Application filed August 17, 1928, Serial No. 300,160. Renewed October 2, 1930.

This invention relates to a combined bumper and mud guard, and relates particularly to the broad combination of rear bumpers, especially rear quarter bumpers and a novel mud guard, so combined and so positioned relative to the rear of the wheels as to directly deflect the mud or other foreign material just as it leaves the tire or wheel and thus prevent the greater portion of such mud or other foreign material from being thrown on the rear portion of the automobile body.

The modern automobile has been so designed that very efficient protection has been given the sides and front of the car so that in normal driving very little mud, dust or foreign material is thrown up on the sides of the car. The back of the car, however, has always received a large amount of mud and other foreign material, and even the top of the car receives its share of mud and dust thrown from the rear wheels. In recent years rear quarter bumpers have come into extended use, and it is the primary object of the present invention to utilize the position of such rear quarter bumpers and their peculiar formation, in combination with a novel mud deflector or guard so positioned relative to the bumper as to deflect or stop the mud or other materials almost at the source.

It is a further object of the invention to so fabricate and locate the mud guard or deflector member as to make the same easily attachable to the bumpers, and furthermore to materially reinforce the rear quarter bumpers.

In the drawings:

Fig. 1 is a fragmentary plan view of the rear corner of an automobile body embodying the features of the present invention.

Fig. 2 is a perspective view of a preferred form of mud guard or deflector plate, as adapted to be used with a rear bumper such as shown in Fig. 1.

Fig. 3 is a fragmentary rear view of the structure shown in Fig. 1 and illustrating particularly the novel combination between the mud guard and the rear quarter bumper and the positioning of the same relative to the rear wheel.

Fig. 4 is a side view taken partially on line 4—4 of Fig. 1 and showing particularly the preferred position of the mud guard or deflector plate relative to the rear wheel whereby it stops or deflects the mud or other material just before or as it starts to spread.

In illustrating and explaining the present invention I have shown the same as being applied to and being in direct combination with the rear quarter bumpers of an automobile, but it will be understood that my novel mud guard or deflecting plate may be equally well combined or used with other forms of bumper structure so long as the same is positioned rearwardly of and at the correct height relative to the rear wheels whereby to effectively prevent the throwing of mud and other foreign materials upwardly against the back and top of the body.

In the preferred embodiment illustrated, the body of the automobile may be generally designated 1 and the rear fender thereof, as at 2. Automobile bodies and fenders of course vary considerably with the symmetry of design of the particular car, but as a rule the fenders are generally positioned approximately as illustrated with the result that practically all the mud and other foreign material thrown rearwardly and upwardly by the rear wheel is free to be thrown upon the back and top of the car body.

Positioned rearwardly of the fender 2 is illustrated a conventional type of rear quarter bumper 3 having arcuate shaped bumper bars 4 and 5 secured to the frame of the body by suitable brace members 6 and 7. It will be understood that said showing of the rear quarter bumper is entirely conventional as practically any design and style of rear quarter bumper, or even a full bumper may be utilized in connection with the present invention.

Adapted to conform in general to the contour of the particular rear quarter bumpers being used, and preferably adapted to be positioned interiorly of the lower bumper bar, is a mud guard or deflector member which may be generally designated 8. In Fig. 2 I have shown one form of deflector member which may be utilized in connection with the type of rear quarter bumper as illustrated in Fig. 1 and in such preferred construction the rear arcuate portion of the deflector plate is preferably offset as at 9 whereby the vertical portion of said offset contacts with the side or inner edge of the lower bumper bar, and the bottom portion 10 of said offset portion contacts with the bottom of the bumper bar 5. The front portion 11 of the plate is preferably upturned, as shown, whereby to reinforce the plate as well as the bumper and to prevent material damage to the fender in case the quarter bumper should be subjected to an abnormal shock.

The deflector plate 8 of course may be of any shape and attached to the bumpers or bumper in any preferred manner. In Fig. 4 I have shown the plate 8 as being connected as by means of a suitable bolt 12 to suitable angle members 13 which may be spot welded or otherwise secured to the bumper. A modified form of securing means is illustrated at 14 wherein the attaching member is shown as extending above and over the top edge of the lower bar 5 of the bumper.

It will thus be seen that I have provided a very compact, inexpensive mud guard or deflector plate which is preferably adapted to be combined with rear quarter bumpers so as to be practically hidden from view but at the same time rigidly positioned relative to the rear tire of the automobile so as to deflect or stop substantially all of the mud or other materials thrown from the tire. The positioning of this mud guard or deflector plate within the limits of the rear guard bumper also materially assists in reinforcing such bumper in addition to its guarding and deflecting function.

It will be understood that the contour and manner of positioning the mud guard or deflector member and the bumper members may vary considerably according to the type and size of the bumper members used in a particular car.

What I claim is:

1. The combination of a vehicle having a pair of rear quarter bumpers, located slightly to the rear of the rear wheels of the vehicle, and a deflector plate secured to each rear quarter bumper and extending laterally at least to the line of projection of the chassis channel frame member and forwardly and approximately horizontally thereof, said bumpers and said plate being so positioned above the normal ground level and behind the wheels whereby to stop or deflect mud or other foreign material as it is thrown rearwardly and upwardly from the rear wheels.

2. The combination of a vehicle having a pair of rear quarter bumpers of a flat deflector plate positioned within the contour of the bumper and between the bumper bar or bars and the rear tire of the vehicle, said bumpers and said plate being so positioned above the normal ground level and behind the wheels whereby to deflect or stop mud or other foreign material as it is initially thrown whereby to stop mud or other foreign materials thrown from the rear wheel.

3. A combination of a vehicle having a pair of rear quarter bumpers, of a flat deflector plate having its deflector surface positioned within the contour of the bumper and supported by the lower bar or bumper, said deflector plate extending substantially horizontally between said lower bar and the rear tire of the vehicle.

4. The combination with a vehicle having a rear fender extending around and back of the rear wheel, of a bumper having a portion thereof spaced from and extending transversely of the rear of the fender, and a flat deflector plate mounted upon a portion of said bumper and positioned rearwardly of said wheel and fender, said bumpers and said plate being so positioned above the normal ground level and behind the wheels whereby to deflect or stop mud or other foreign material as it is initially thrown up from said wheel.

5. The combination with a vehicle having a rear fender extending around and to the rear of the rear wheel, of a bumper supported by the vehicle and having a portion thereof extending transversely and back of the fender and wheel, said portion directly back of said fender and wheel being arcuate in outer contour and terminating adjacent the outer side and rear of the fender, and a deflector plate positioned between the portion of the bumper to the rear of the fender and the rear wheel, said deflector plate being of a size to substantially fill the space between the portion of the bumper to the rear of the wheel and the wheel and fender and extending laterally at least to the line of projection of the chassis channel frame member.

6. The combination with a vehicle having a rear wheel and fender therefor, of a flat deflector plate carried by the vehicle and positioned immediately to the rear of the wheel and fender, said deflector plate extending substantially horizontally and being positioned at a predetermined height above the ground, so as to stop or deflect mud or other foreign material as it is initially thrown up from said wheel.

7. The combination of a vehicle of the type having rear fenders extending around and back of the rear wheels, of deflector plates carried by the vehicle and extending transversely of and positioned directly behind the rear wheels of the vehicle, said deflector plates being relatively small in surface area and being so positioned to the rear of the wheels and above the ground as to stop or deflect the mud or other foreign material as it is initially thrown from the wheels.

8. The combination of a vehicle having a pair of rear quarter bumpers, of deflector plates positioned substantially within the contour of said quarter bumpers, the outer rear edge of said plates conforming in contour with the contour of the bumper bar or bars, and said rear edge of the plates being offset whereby to cooperate with the lower bar of said bumpers.

9. The combination with a vehicle having rear quarter bumpers, of a deflector plate positioned substantially within the contour of each bumper and serving to reinforce the same, said deflector plate also extending laterally to the line of projection of the chassis channel frame member and a sufficient distance from the bumper bars toward the rear wheel and being so positioned above the ground as to deflect or stop mud or other foreign material as it is initially thrown from the rear wheels and prevent the same from being thrown onto the rear portion of the vehicle body.

In testimony whereof I affix my signature:

BELLA BEANE.